COLOR PICTURE INFORMATION RECORDING AND REPRODUCING SYSTEM

Original Filed June 16, 1964

INVENTORS.
PETER C. GOLDMARK &
DENNIS GABOR
BY
Brumbaugh, Free, Graves & Donohue
their ATTORNEYS INVENTORS.
PETER C. GOLDMARK &
DENNIS GABOR
BY
Brumbaugh, Free, Graves & Donohue
their ATTORNEYS United States Patent Office 3,459,885
Patented Aug. 5, 1969

3,459,885

COLOR PICTURE INFORMATION RECORDING AND REPRODUCING SYSTEM

Peter C. Goldmark, Stamford, Conn., and Dennis Gabor, London, England, assignors to Columbia Broadcasting System, Inc., New York, N.Y., a corporation of New York Continuation of application Ser. No. 375,469, June 16, 1964. This application Oct. 26, 1967, Ser. No. 678,452
Int. Cl. H04n 5/38, 1/46, 5/44
U.S. Cl. 178—5.4 51 Claims

ABSTRACT OF THE DISCLOSURE

Apparatus and methods related to the recording and reproduction of color picture information on monochrome photographic film. Frames of the film are recorded in a succession of transverse lines each containing a record of a color carrier signal modulated in amplitude and phase according to the color content along a corresponding line of the original scene and a superimposed record of a reference carrier at a different frequency that is related to the color carrier frequency by an integer multiple. The frequencies of both carriers are multiples of the line recording rate, so that the cyclic variations of the recorded carriers tend to be in longitudinal alignment throughout each frame. During reproduction, the frames are scanned in a similar manner to derive a composite signal containing components at both carrier frequencies, which are extracted and applied to a synchronous detector to recover modulation of the color carrier.

This application is a continuation of U.S. patent application Ser. No. 375,469, filed June 16, 1964.

The present invention relates to methods and apparatus for recording picture or other information on a record medium and for reproducing on the screen of a television receiver information so recorded. More particularly, it has to do with methods and apparatus of this character which utilize a record medium carrying color picture information recorded in monochrome.

A number of systems have been proposed heretofore which involve recording color information in monochrome on a record medium for subsequent reproduction on television equipment. In one such system, brightness information and color information in a picture are to be recorded in superimposed relation on black and white film in a series of transverse lines spaced longitudinally of the film. The color information is recorded in the form of phase and amplitude modulation of a color subcarrier which is an odd multiple of one-half the horizontal scanning frequency. The film record includes, in addition to image frames, a series of reference frames in which are recorded displays of a color sampling frequency of reference phase and amplitude from which a reference carrier may be derived as required for demodulating the subcarrier to recover the color information theefrom. Such a system is not practical because the color subcarrier recorded in each line is always shifted in phase with respect to the color carrier recorded in the preceding line, so that the reproducing scan must be made to track the recorded lines accurately, if good color rendition is to be secured. Also, the difficulties inherent in maintaining registration between the two sets of motion picture film frames to the degree of precision required for accurate color rendition would be almost insurmountable in the present state of the art.

In another system that has been considered, two components of color information have been recorded as amplitude modulations of two different carriers, respectively, both having frequencies above the highest frequency present in the recorded brightness information. This system likewise is not practical because the carriers produce undesirable "beats" that are visible in the reproduced picture. It has been proposed to overcome this difficulty by recording the two color information components as upper sidebands, respectively, of two suppressed carrier signals, the carriers being recorded in the interframe spaces. While this expedient may reduce the likelihood of visible "beats" between the carriers, it still does not result in a practical system since nonlinearities present in the lines constituting the image frames and not present in the carriers recorded in the interframe spaces will introduce color distortions in the reproduced picture.

The aforementioned deficiencies of the prior art systems have been overcome according to the present invention by utilizing a color carrier that is a multiple of the horizontal line rate, recording in superimposed relation to the carrier a pilot carrier having a frequency that is one-half the color carrier frequency, and deriving from the recorded pilot carrier a reference signal for use in extracting the modulation on the color carrier. With the frequencies of the color and pilot carriers so related to the horizontal line scanning rate, the carriers recorded in successive lines are all in phase so that they form a plurality of transversely spaced lines extending longitudinally of the film. Hence, a random reproducing scan may be used and accurate tracking of the recorded lines is not necessary. Also, the system can readily tolerate without adverse effect any small lateral displacements to which the film may be subjected by the film transport mechanism, since such displacements will be imparted simultaneously to both the recorded pilot carrier and the recorded color carrier sidebands. Furthermore, any nonlinearities in the recording or reproducing scans will affect both carriers in the same way so that it is possible to extract the color information from the color carrier with a minimum of distortion.

Deficiencies in the record medium or in the recording system will likewise affect the recorded carriers in the same way so that an error signal representative of such deficiencies can be derived from the recorded reference carrier and used to compensate for the effect of such deficiencies in the recorded color carrier.

In order to keep the highest frequency to be recorded on the film as low as possible, the frequency of the color carrier should preferably not be much higher than the highest frequency in the picture brightness band and it may actually be within the brightness band as will usually be the case with the pilot carrier. Desirably, brightness signal components in a narrow band centered on the pilot frequency should be essentially eliminated from the recorded brightness signal. In order to materially reduce the visibility of any carrier signal in the reproduced picture, the recorded carrier or carriers should preferably be shifted 180° in phase in sucessive fames. Also, signals of the same frequencies as any carriers within the brightness band may be injected at the receiver and adjusted in phase and amplitude so as to render any carrier completely invisible in the reproduced picture.

For a better understanding of the invention, several representative embodiments thereof are described in detail below and illustrated in the accompanying drawings, in which.

By way of example, the invention will first be illustrated as applied to a recording reproducing system for handling information in color. Briefly, the system includes means for recording color picture information in a succession of frames, each including a plurality of closely-spaced transverse lines on a record medium, which may be monochrome film, for example. Each line is preferably recorded by intensity modulating a luminous spot simultaneously in accordance with three different quantities, viz. the brightness information in the corresponding line of an original picture; the sidebands of a suppressed carrier modulated in amplitude and phase by color saturation and hue information in the corresponding line of the original; and a pilot carrier adapted to be used in the receiver to derive a carrier to enable the modulation to be extracted from the color carrier sidebands.

Figure 1:
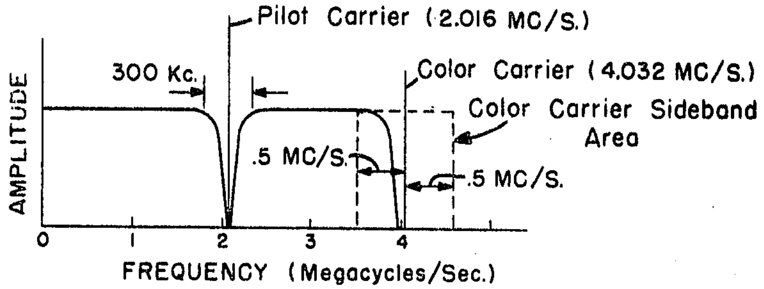
FIG. 1 is a graph of a typical spectrum showing the frequency composition of the several signals recorded on the record medium in one embodiment of the invention.

As shown in FIG. 1, the bightness information may include frequency components in the range from zero to about four megacycles per second, except for a narrow band centered on the pilot carrier. The color carrier frequency may be located just above the upper limit of the brightness information band, and, according to the invention, it should be a multiple of the horizontal line scanning frequency. In the United States, where the horizontal line scanning frequency is usually 15,750 cycles per second, a suitable color carrier frequency would be 4.032 megacycles per second.

Preferably, the color carrier is modulated in accordance with two color difference signals, e.g., red R minus brightness Y ($R-Y$) and blue B minus brightness Y ($B-Y$), the color carrier sidebands being restricted to, say, one-half megacycle per second on either side of the color carrier, as appears from FIG. 1.

The pilot carrier is preferably made one-half the frequency of the color carrier or 2.016 megacycles per second for a color carrier frequency of 4.032 megacycles per second. For a pilot carrier of this frequency, frequency components in a band, say, 300 kilocycles wide centered on the pilot frequency should be excluded from the brightness information, as indicated in FIG. 1. Desirably, the pilot carrier is recorded at relatively low amplitude, e.g., from five to fifteen percent of the color carrier amplitude.

Figure 3:
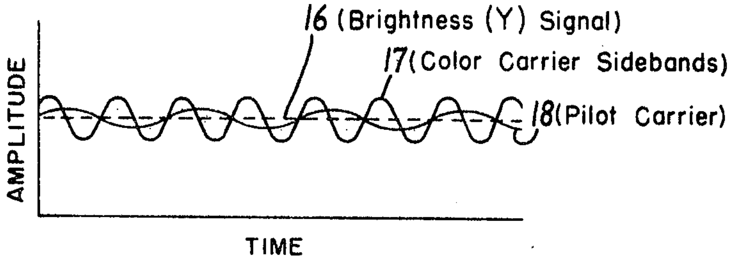
FIG. 3 is a graph illustrating the amplitude variations with time of the signals recorded by the apparatus shown in FIG. 2.

A typical monochrome film record 10 embodying the features described above is shown in FIG. 4. It comprises a succession of frames 11, 12 and 13 containing recorded picture information with one or more sound tracks 14 and 15 located adjacent the edges of the film 10. The sound tracks per se are not part of the present invention and any conventional form of sound track may be used. For simplicity, it will be assumed that like information is recorded in all three frames 11, 12 and 13, and that the signals recorded are substantially as shown in FIG. 3, representing an area of uniform brightness, hue and saturation. In FIG. 3, the dotted line 16 represents the brightness signal, the curve 17 is a graph of the color carrier sideband information, which varies in amplitude and phase in accordance with color saturation and hue, respectively, and the curve 18 is the low amplitude pilot carrier.

Since the color carrier frequency is a multiple of the horizontal line scanning rate used in recording the information, while the pilot carrier is one-half the color carrier frequency, peak and valley amplitudes in both will produce on the film laterally spaced apart areas more dense and less dense, respectively, than the brightness background, which will line up vertically (longitudinally of the film). Preferably, successive transverse lines are recorded in contiguous relation, either by anamorphosing the film in the direction of its motion as in FIG. 4, or by imparting to the recording luminous spot a vertical oscillation of suitable amplitude and frequency to fill any spaces between successive transverse lines. As a result, the color sideband information appears as a group of closely spaced vertical lines 19, the pilot carrier as a plurality of somewhat lighter vertical lines 20 spaced apart twice the distance between the lines 19, and the brightness information as the background against which the vertical lines 19 and 20 are viewed. In the interest of clarity, the spacings between the several sets of lines 19 and 20 have been greatly exaggerated. While the showing in FIG. 4 is not strictly accurate, it will suffice for the purposes of this explanation.

In order to minimize visibility of the lines 19 and 20 in the image eventually reproduced on a television receiver, preferably both the color sideband information and the pilot carrier are recorded in reversed phase on successive frames. Thus, in FIG. 4 the second frame from the top has vertical lines 19' and 20' that are shifted laterally from the lines 19 and 20 in the preceding frame, the amount of shift corresponding to an electical phase reversal of 180°.

The film record also carries synchronizing indicia which are adapted to be scanned to produce synchronizing signals for maintaining the film speed in synchronism with the field scanning rate in the television receiver reproducer, as described in detail below. Two exemplary types of synchronizing indicia are shown on the film 10 in FIG. 4. The indicia S1 comprise a plurality of slit-like transparent areas associated with respective film frames and formed in an opaque strip disposed between one edge of each frame and the inside edge of the sound track 15. The indicia S2 include a plurality of transversely spaced apart bars recorded at the bottom of each frame. When these are scanned by the same beam that scans the picture information in the frames, an alternating current signal is produced which can readily be separated from the video signal information for synchronization purposes.

Figure 4:
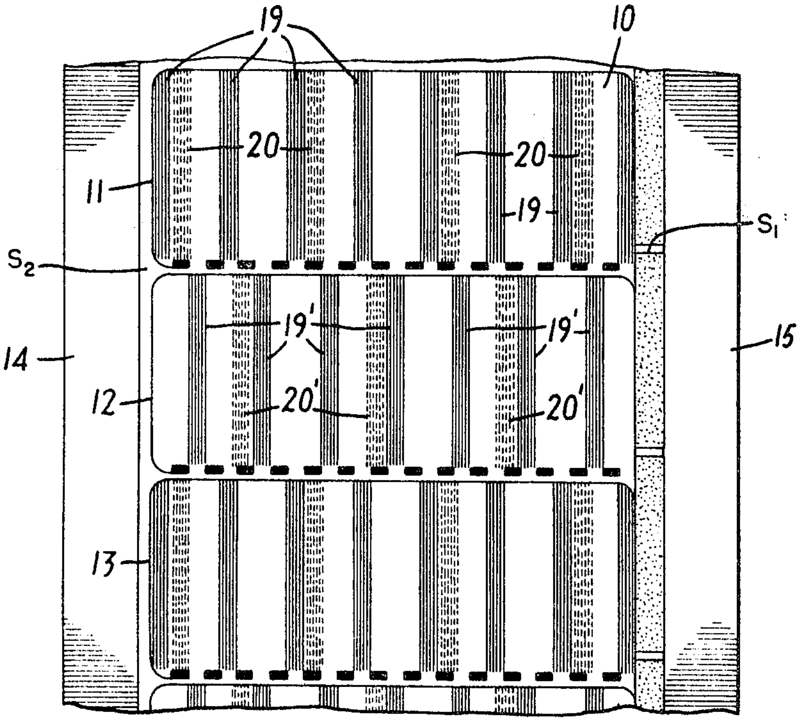
FIG. 4 is a simplified schematic illustration of a portion of a record such as might be made by the apparatus of FIG. 2.
Figure 2:
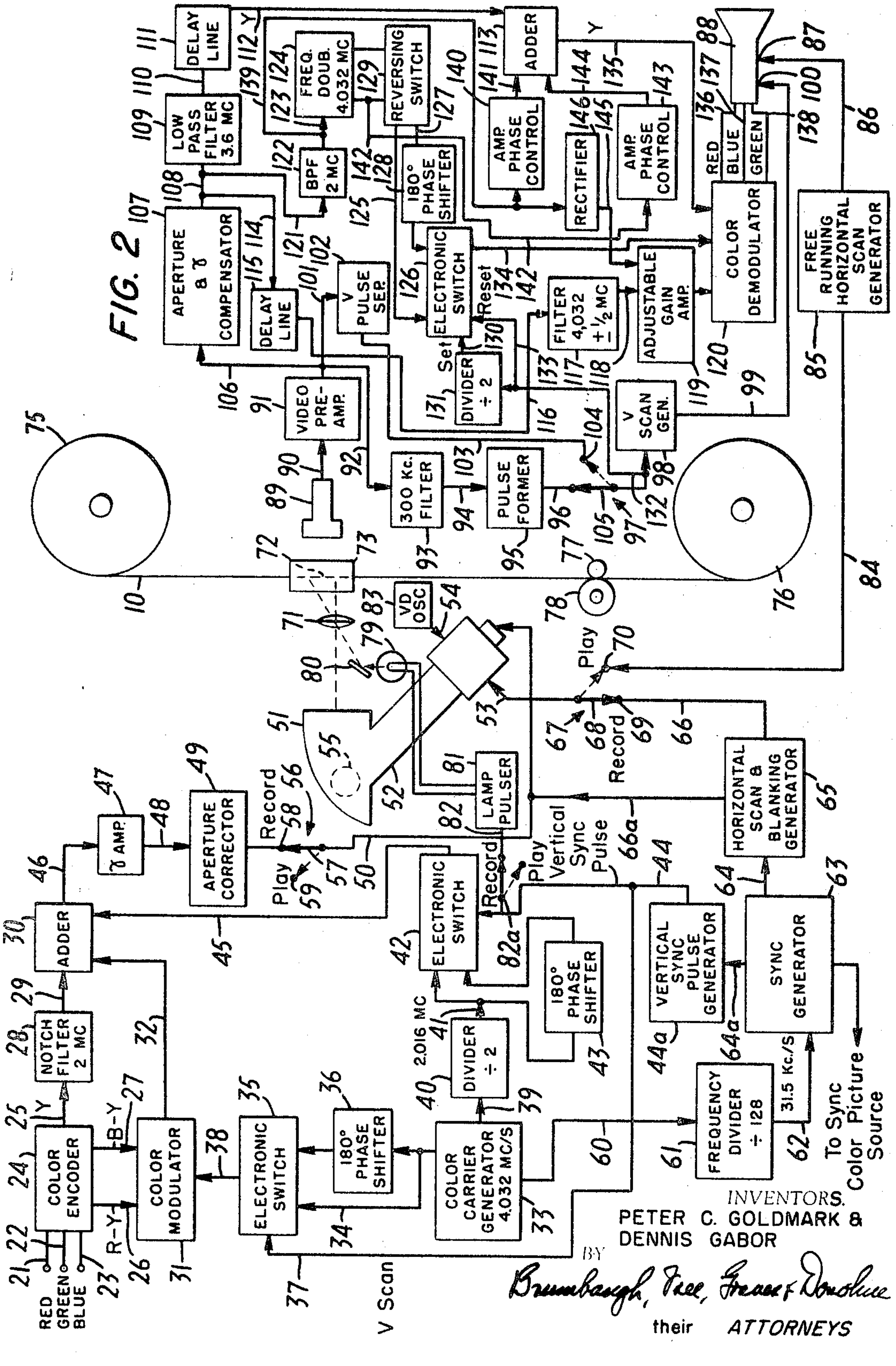
FIG. 2 is a schematic diagram of apparatus constructed according to the invention which, in one condition, is adapted to produce a record of color picture information and, in another condition, is adapted to reproduce such recorded information on the screen of a conventional television receiver.

In FIG. 2 is shown a typical system including componentes for producing a record of the type illustrated in FIG. 4, and other elements adapted to be used for reproducing on a conventional television picture tube the picture information recorded on the record medium.

Referring to FIG. 2, red, blue and green color picture information signals from suitable source such as a conventional color camera, for example, are supplied over conductors 21, 22 and 23 to a conventional color encoder or matrixing amplifier 24. The latter may be of the type capable of providing an output on a conductor 25 representing the brightness picture information (usually designated the "Y" signal) and two color difference signals $R-Y$ and $B-Y$ at the conductors 26 and 27, respectively. A conventional notch filter 28 extracts from the Y signal frequency components in a band approximately 300 kc. wide centered on say, 2.016 megacycles, the frequency which it is proposed to use for the pilot carrier as described below. The Y signal with this band of frequencies extracted is supplied over a conductor 29 to an adder 30.

The $R-Y$ and $B-Y$ signals are supplied over the conductors 26 and 27, respectively, to a color modulator 31 of a well-known type capable of supplying to the adder 30 over a conductor 32 upper and lower sidebands of a suppressed color carrier signal modulated in amplitude and phase in accordance with color saturation and hue information. To this end, the color modulator 31 receives a color carrier signal at say, 4.032 megacycles from a color carrier generator 33 which supplies one output through a conductor 34 directly to an electronic switch 35 and a second output through a 180° phase shifter 36 to the switch 35. The switch 35 is adapted to be actuated by a vertical synchronizing pulse transmitted over a conductor 37 during the vertical blanking and horizontal retrace periods between successive recorded frames and it functions to reverse the phase of the color carrier signal supplied to the color modulator 31 over the conductor 38 upon the completion of each recorded frame.

The color carrier generator 33 also supplies a signal through a conductor 39 to a frequency divider 40 which steps the frequency down to one-half or 2.016 megacycles per second. The divider 40 supplies a 2.016 megacycles per second signal through a conductor 41 directly to an electronic switch 42 and also through a 180° phase shifter 43 to the switch 42. The switch 42 is adapted to be actuated by vertical synchronizing pulses received over a conductor 44 to supply the 2.016 megacycles per second signal through a conductor 45 to the adder 30. This signal constitutes a pilot carrier which is to be recorded on a record medium with the brightness information and the color information as described above. The electronic switch 42 serves to reverse the phase of the pilot carrier by 180° upon completion of each film frame so as to reduce its visibility in the picture eventually reproduced on the television receiver, as will be described in greater detail below.

The adder 30 provides an output which is the sum of the Y signal, the sidebands of the color carrier signal modulated in accordance with color saturation and hue information and the 2.016 megacycle per second pilot carrier. This sum signal is fed through a conductor 46 and a conventional gamma or contrast amplifier 47, a conductor 48, an aperture correction device 49, which may be of the type disclosed in prior U.S. Patent No. 3,011,018, and a conductor 50 to the beam intensity control electrode of a so-called "line scan" cathode ray tube 51.

The line scan tube 51 may be of the type described on pages 34–37 of the Mar. 16, 1960 issue of "Electronic Design." It is similar to a conventional cathode ray tube in that it has an electron gun 52 with horizontal and vertical deflection terminals 53 and 54, respectively. It differs from a conventional cathode ray tube in that the phosphor screen is formed on the peripheral surface of a cylindrical drum 55 mounted for impingement of the electron beam thereon and for rotation about an axis aligned with the horizontal deflection direction of the beam. The rotation of the drum continuously changes the portion of the phosphor coating exposed to the beam so that high brilliance or luminosity of the spot without concurrent burnout of the phosphor can be realized.

Connected in series with the conductor 50 is a switch 56 having a movable contact 57 which is adapted to be engaged with a fixed contact 58 during a recording operation and which, in a playback operation, is adapted to be moved into engagement with a contact 59.

The color carrier generator 33 also supplies a signal over a conductor 60 to a frequency divider 61 which divides it by a factor of 128 to produce a 31.5 kc. per second signal which is fed through a conductor 62 to a conventional synchronizing generator 63. The synchronizing generator 63 supplies the usual horizotal and vertical synchronizing signals required for proper operation of the source from which the color picture signals fed to the color encoder 24 are derived. It also supplies synchronizing signals through a conductor **64*a* to a vertical synchronizing pulse generator 44*a*** which supplies the vertical synchronizing pulses required in the system.

In addition, the generator 63 supplies synchronizing sigals over a conductor 64 to a horizontal scan and blanking generator 65 of conventional form which provides horizontal deflection signals over a conductor 66 and through a switch 67 to the horizontal deflection terminals 53, and horizontal blanking signals through a conductor **66*a* to the beam intensity control electrode of the line scan tube 51. The switch 67 has a movable contact 68 which engages a fixed contact 69 in the recording position and is adapted to be moved to engage another fixed contact 70** in the playback position.

The horizontal scanning and blanking generator 65 supplies to the line scan tube 51 the necessary signals to cause the beam thereof to sweep across the phosphor screen at the usual horizontal line scanning rate which, according to United States standards, is 15,750 cycles per second, and to blank out the beam during horizontal retrace and also for a period after the completion of a complete frame scan.

An image of the line produced by the beam impinging upon the phosphor drum 55 is focussed by a suitable lens system 71 at a scanning zone 72 in a film gate 73 through which a narrow strip of photographic film 10 is adapted to be transported. The film 10 is fed from a supply reel 75 to a takeup reel 76 and it is adapted to be transported by a motor driven capstan 77 and pressure roller 78 combination similar to that used in a conventional tape recorder.

Synchronizing indicia of the type $S_2$ in FIG. 4 may be applied to the film 10 in any conventional manner as by directing light from a lamp 79 to a reflector 80 and through the lens 71 to illuminate a suitably positioned slit (not shown) in the film gate 73. The lamp 79 is adapted to be pulsed once during the scanning of each frame on the film by a lamp pulser 81 actuated by a vertical synchronizing signal received from the vertical synchronizing pulse generator over the conductors 44 and 82 and the switch **82*a***.

Where synchronizing indicia of the type $S_1$ in FIG. 4 are desired, they may be applied to the film by positioning the lamp 79 and reflector 80 to illuminate a slit the full width of the frame and by interposing a suitably shaped mask in the path of the light. Alternatively, synchronizing pulses of this type may be formed by applying an appropriate modulation to the beam intensity control electrode of the line scan tube 51.

In a typical recording operation, the switches 56, 57 and **82*a* are moved to the "record" position, as shown in FIG. 2, and color picture information signals from a conventional camera or like source are supplied to the color encoder 24 over the conductors 21, 22 and 23. In a typical system, the line scan tube 51 may be blanked out for a short period after completion of a succession of 525 horizontal scans and the speed of transport of the film 10 may be adjusted so that the 525 line scans occur in the time required for the film 10** to move through the scanning zone a distance equal to the pitch of one anamorphosed frame on the film of FIG. 4. This will result in the production of anamorphosed frames so that adjacent lines recorded on the film will be contiguous.

Alternatively, the film 10 may be transported at a speed such that it travels the proper frame pitch distance during each succession of 525 line scans by the tube 51. In such event, the successive lines recorded may be made contiguous by imparting to the cathode ray beam a vertical (longitudinal) oscillation of sufficient amplitude and frequency to fill in the space between adjacent lines. To this end, a vertical deflection oscillator 83 is connected to the vertical deflection terminals 84 of the tube 51, as shown in FIG. 2.

After the picture information has been recorded on the film 10, the latter may be developed in the conventional manner and the magnetic soundtrack or tracks 14 and 15 applied in accordance with any suitable technique. The film is then ready for playback.

The playback portion of the apparatus in FIG. 2 includes the line scan tube 51 with the switches 56, 67 and **82*a* in the "Play" position. With the switch 56 so positioned, the beam intensity in the tube 51 is not modulated but is constant at a level to produce a scanning line of desired brightness on the phosphor drum 55. Opening the switch 82*a* discontinues the supply of vertical synchronizing pulses to the lamp pulser 81 so that the lamp 79 remains on continuously. The "Play" position of the switch 67 connects the horizontal deflection electrode 53 of the tube 51 through a conductor 84 to a free-running horizontal scanning signal generator 85 which also supplies horizontal scanning signals through a conductor 86 to the horizontal deflection terminals 87 of a conventional color television picture tube 88** in the receiver.

The scanning line generated by the line scan tube 51 is imaged at the scanning zone 72 in the film gate 73 through which a film 10 to be reproduced is transported from the supply reel 75 to the take-up reel 76. Light from the scanning line and the lamp 79 which is transmitted through the film 10 impinges upon a photomultiplier tube 89 which supplies a composite video signal including video information and vertical synchronizing information through a conductor 90 to a video preamplifier 91.

Synchronizing signals produced by indicia of the type $S_2$ shown in FIG. 4 may be extracted from the composite video signal by supplying the output of the preamplifier 91 through a conductor 92 to a bandpass filter 93 tuned to pass signals of the frequency generated when these synchronizing indicia are scanned by a line scanning operation in the line scan tube 51. In a practical case, the spacing between the bars constituting the indicia $S_2$ (FIG. 4) may be selected to produce a frequency of say, 300 kc. per second when subjected to line scan, in which case the bandpass filter 93 will be tuned to this frequency. The output of the filter 93 is fed through a conductor 94, to a pulse former 95 which supplies a vertical synchronizing pulse through a conductor 96 and switch 97 to a vertical scan generator 98. The latter in turn supplies suitable vertical scanning and blanking signals through the conductor 99 to the vertical deflection terminals 100 of the tube 88.

Alternatively, synchronization signal pulses generated by light from the lamp 79 passing through the indicia $S_1$ on the film 10 (FIG. 4) may be extracted from the composite video signal by supplying the output of the video preamplifier 91 through the conductor 101 to a conventional pulse separator 102 of a type suitable for separating video signal information from the pulses generated by scanning the indicia $S_1$ on the film 10. The pulse separator 102 supplies a pulse output through a conductor 103 to a fixed terminal 104 of the switch 97 so that when the movable contact 105 of the latter is moved into engagement with the fixed contact 104, this pulse output is supplied to the vertical scan generator 98 for synchronizing purposes.

The amplified video information signals at the output of the preamplifier 91, including the pilot carrier and the color carrier modulation, pass through a conductor 106 to conventional aperture and contrast compensation apparatus 107. Thence, the signals pass through a conductor 108 to a low pass filter 109 designed to cut-off at an upper frequency limit of say, 3.6 megacycles per second. The output of the filter 109 passes through a conductor 110 to a delay line 111 and thence over a conductor 112 to an adder 113.

The output of the aperture and contrast compensator 107 is also supplied over a conductor 114 to a delay line 115 from which it is fed through a conductor 116 to a filter 117 designed to extract the color carrier sidebands and reject the brightness signal information. To this end, it is adapted to pass a band of frequencies approximately one megacycle wide centered on the carrier frequency of 4.032 megacycles per second. The extracted color sidebands are then transmitted through a conductor 118 and an amplifier 119, whose gain is adapted to be adjusted in response to a control signal, to a conventional color demodulator 120. The latter includes conventional synchronous detector apparatus in which the color carrier sidebands are combined with a reconstituted color carrier to enable the original *R—Y* and *B—Y* modulation to be extracted.

The color demodulator 120 should have sufficient bandwidth to be able to tolerate without phase shift such frequency variations as may result from variations in linearity of the lines recorded on the film 10, or in the size or linearity of the scanning line generated by the line scan tube 51.

The reconstituted color carrier is derived by separating from the composite video signal the 2.016 megacycle per second pilot carrier. This is accomplished by supplying the composite video signal over a conductor 121 to a bandpass filter 122 tuned to the pilot carrier frequency, and preferably having a pass band narrower than the notch filter 28. The extracted pilot carrier is then fed over a conductor 123 to a frequency doubler 124 which steps it up to the frequency of the color carrier, viz., 4.032 megacycles per second.

Since the action of the frequency doubler 124 involves rectification, it will be understood that the 4.032 megacycle per second signal output will always be fixed in phase, regardless of the phase reversals in the pilot carrier recorded in successive frames on the film 10. However, since the color carrier modulation recorded on the film 10 is also reversed in phase in successive frames, it is necessary that the doubled pilot carrier output from the frequency doubler 124 be reversed every other frame so that it will have the proper phase to extract the color carrier information from the carrier sidebands in the color demodulator 120.

This is accomplished by feeding the doubled pilot carrier from the frequency doubler 124 through the conductor 125 directly to an electronic switch 126 and through the conductor 127 and a 180° phase shifter 128 to the switch 126, a simple reversing switch 129 being provided for reversing the connections between the frequency doubler 124 and the conductors 125 and 127. The switch 126 is adapted to be set to one position by pulses received over a conductor 130 from a divider by two 131 which receives vertical synchronizing pulses over a conductor 132, and to be reset to its initial position by vertical synchronizing pulses received over a conductor 133. The output of the switch 106 is fed over a conductor 134 to the color demodulator 120 where it is utilized in synchronous detection apparatus to extract the color information from the color carrier sidebands in the known manner.

It will be understood, therefore, that the switch 126 will reverse the phase of the doubled pilot carrier from the frequency doubler 124 every other frame on the film 10. Also, the phase can be set initially by operation of the reversing switch 129 to meet the requirements of the synchronous detector apparatus in the color demodulator 120.

A third input to the color demodulator 120 is the brightness signal Y which is received from the adder 113 through a conductor 135. The color modulator 120 also includes conventional matrixing amplifiers which derive from the Y, $R-Y$ and $B-Y$ signals the original red, blue and green signals supplied to the color encoder 24 in the recording operation. The red, blue and green signals are supplied over the conductors 136, 137 and 138 to the beam intensity control electrodes of the color television picture tube 88.

In order to eliminate any residual line structure from either or both the pilot carrier and the color carrier in the image reproduced on the color picture tube 88, small amounts of signals of these frequencies and of suitable amplitudes and phase may be added to the Y signal before it is supplied to the color demodulator 120. Thus, a signal of pilot carrier frequency may be supplied from the bandpass filter 122 over the conductor 139 to a suitable amplitude and phase control 140 which supplies an output through a conductor 141 to the adder 113. In similar fashion, a signal of the color carrier frequency (4.032 megacycles) may be supplied from the frequency doubler 124 over the conductor 142 to an amplitude and phase control device 143 providing a signal of this frequency over the conductor 144 to the adder 113.

By proper adjustment of the amplitude and phase control devices 140 and 143, any residual components of pilot or color carrier frequency supplied over the conductor 112 may be substantially completely cancelled out. This feature, combined with the fact that either or both of the pilot and color carrier frequencies in the original film 10 are recorded 180° out-of-phase in successive frames, results in substantially complete elimination of any carrier signal line structure in the picture eventually reproduced on the screen of the cathode ray tube 88.

In order to compensate for spurious amplitude variations in the color carrier modulation resulting from system deficiencies, such as optical defocussing, for example, the gain of the amplifier 119 is adjusted in accordance with a control signal supplied over a conductor 145 from a rectifier 146 which receives the pilot carrier signal from the filter 122 over the conductor 139. Since both the pilot carrier and the color carrier modulation respond similarly to such effects, it will be understood that the automatic gain control circuit described will automatically compensate for such variations in the color carrier sidebands.

In a reproducing operation, a film 10 made in accordance with the recording technique described above is threaded through the film gate 73 and is transported by the motor driven capstan 77, pressure roller 78 combination shown in FIG. 2. The switches 56, 67 and **82*a* are moved to the "Play" position as described above, and the vertical deflection oscillator 83** is turned off.

It will be assumed that synchronization between the film speed and the field rate of the tube 88 is to be effected by the synchronizing indicia $S_2$ on the film 10 (FIG. 4). Accordingly, the switch 97 is operated to bring its movable contact 105 into engagement with the fixed contact connected to the conductor 96.

As the film is transported through the film gate 73, it is scanned by the line scan tube 51, producing video signals and signals corresponding to the indicia $S_2$ (FIG. 4) at the output of the photomultiplier tube 89. The 300 kc. per second signal produced by scanning the synchronizing indicia $S_2$ (FIG. 4) is supplied through the filter 93 and pulse former 95 to the vertical scan generator 98 so that the vertical scan in the television receiver tube 88 is initiated in synchronism with the arrival of each of the frames on the film in FIG. 4 at a predetermined position in the scanning zone. It will be apparent, therefore, that the successive fields generated at the receiver tube 88 will be maintained strictly in synchronism with the frames on the film, regardless of any variations in the speed of transport of the latter.

The video information signal passes from the preamplifier 91 through the aperture and contrast compensating device 107, the low pass filter 109 and the delay line 111 to the adder 113 which in turn supplies a brightness signal input to the color demodulator 120.

The color information in the form of modulation sidebands of the color carrier is supplied through the delay line 115 and the filter 117 to the color demodulator 120. The 2.016 megacycle per second pilot carrier signal in the output of the video preamplifier 91 is fed through the bandpass filter 122, doubled in frequency by the frequency doubler 124 and reversed every other frame before being fed to the color demodulator where it is utilized to extract the color saturation and hue information from the color sideband signals supplied to the color demodulator 120 from the amplifier 119. The purpose of the delay lines 111 and 115 is to delay the brightness and color information signals so that they will be in coincidence with the pilot information which has been delayed by the action of the bandpass extraction filter 122.

Since both the pilot carrier and the color carrier are reversed in phase at the conclusion of each frame, any vertical line structure in the picture reproduced by the receiver tube 88 as a result of the presence of these frequencies in the signal will be greatly reduced in visibility. Further, by adjustment of the amplitude and phase control devices 140 and 143, any residual line structure in the picture can be completely eliminated.

The invention thus provides a novel recording and reproducing apparatus which is of particular utility for recording and reproducing color information. By utilizing a color carrier that is a multiple of the horizontal line scanning rate and a pilot carrier that is one-half the color carrier frequency, the two carriers appear as vertical lines on the record medium so that accurate tracking of the recorded lines is not necessary and a random scan can be used to reproduce the recorded picture. Further, by reversing the phases of one or both of the carriers at the conclusion of each recorded frame, the visibility of the vertical line structure in the reproduced picture can be greatly reduced.

It will be understood that the several specific embodiments described above and shown in the drawings are readily susceptible of modification in form and detail within the skill of the art. For example, a wide variety of synchronizing marks other than those shown in FIG. 4 may be employed and color information may be recorded in other ways such as, for example, by modulating the color carrier in accordance with the I and Q color components of the conventional NTSC color television system. Also, phase recognition indicia may be recorded in association with alternate frames on the film 10 and used to control the electronic switch 126 to reverse the doubled carrier every other frame, instead of the divider 131 (FIG. 2).

It will be understood that raster scanning of the film record medium may be employed instead of the line scan shown in FIG. 4. The raster scan may follow the direction of film movement, as disclosed in the copending application of Bernard Erde, Ser. No. 268,911, filed Mar. 29, 1963, for "Film Scanning," in which event synchronizing indicia of the type $S_1$ in FIG. 4 should be used. Vertical scan in a film record scanner of this type should be initiated by vertical scan pulses from the vertical scan signal generator 98 (FIG. 2) so that the film scanner will be slaved to the receiver in so far as the horizointal and vertical scans are concerned. Raster scanning in the direction opposite the direction of film transport may also be employed, suitable "chasing" mechanism being provided for effectively stopping the film motion during the scanning of each frame. In such case, synchronization indicia either of type $S_1$ or type $S_2$ may be used to maintain synchronism between the film transport rate and the field rate at the receiver reproducer.

The invention is not limited to the recording of color but it has utility in any application where it is desired to record information in the form of a modulated carrier. Of particular interest here is the technique disclosed in the copending application Ser. No. 77,916, filed Dec. 23, 1960, by Peter C. Goldmark and Renville H. McMann, for "Film Recording Reproducing Apparatus," for recording black and white information as frequency modulation of a carrier. By utilizing in such system a carrier which is a multiple of the horizontal line scanning rate, in accordance with the present invention, and by modulating the frequency of the carrier in steps that are multiples of the horizontal line scanning rate, accurate tracking of the recorded lines is not necessary but a random scan may be used for reproduction. The invention, therefore, encompasses all such modifications as come within the scope of the appended claims.

We claim:

1. In apparatus for recording information as a video signal in monochrome on a radiant energy sensitive record medium for later reproduction by scanning, the combination of means for transporting a record medium through a scanning zone, means for causing a beam of radiant energy to sweep periodically transversely of the direction of transport of said record medium to record a succession of transverse lines on a record medium in said scanning zone, and means for modulating the intensity of said beam in accordance with an information carrier signal modulated by information to be recorded, the frequency of said carrier signal being a multiple of the rate of sweep of said beam, said beam having a substantially constant spectral content and intensity for a given instantaneous amplitude of the carrier signal irrespective of the position of the beam in its transverse scan.

2. In apparatus for recording on a radiant energy sensitive record medium, the combination of:

means for transporting a record medium through a scanning zone, means for causing a beam of radiant energy to sweep periodically transversely of the direction of transport of said record medium to record a succession of transverse lines on a record medium in said scanning zone, means for modulating the intensity of said beam in accordance with an information carrier signal modulated by information to be recorded, the frequency of said carrier signal being a multiple of the rate of sweep of said beam, and means for simultaneously further modulating the intensity of the beam in accordance with a reference carrier signal having a different frequency that is related to the frequency of said modulated carrier by an integer multiple.

3. Recording apparatus as defined in claim 2 in which the information carrier is modulated in accordance with color picture information and means is also provided for further modulating the intensity of the beam in accordance with picture brightness information.

4. Recording apparatus as defined in claim 2 together with means for reversing the phase of at least one of said carriers each time a given number of lines constituting a frame has been recorded on said record medium.

5. Recording apparatus as defined in claim 2 including means for imparting a small oscillation to said beam at an angle to the direction of line scan to record contiguous lines on said record medium.

6. Recording apparatus as defined in claim 2 including means for recording synchronizing indicia on said record medium in fixed relation to each record frame thereon.

7. A monochrome motion picture record for the reproduction of color picture information by transverse scanning comprising an elongated, narrow strip of thin, transparent material, and a succession of longitudinally displaced zones of picture information of said strip, each zone comprising a succession of substantially contiguous transverse lines extending longitudinally of the strip, each line containing in superimposed relation a first record of a first periodic waveform having a characteristic varying along the line in acordance with color in the corresponding line of the original, and a second record of a second periodic waveform, the nominal periodicity of one of said first and second waveforms being a submultiple of the nominal periodicity of the other of said waveforms;

said first and second records comprised of an information-yielding characteristic of the material and forming essentially a closely-spaced series of parallel lines extending longitudinally of each zone, whereby a phase reference for the first periodic waveform is provided by the second waveform throughout each zone during simultaneous reproduction of said periodic waveforms by a beam scanning transversely of the record medium.

8. A motion picture record as defined in claim 7 in which the amplitude and phase of the first periodic waveform varies along the line according to two different color components, respectively, in the corresponding line of the original.

9. A motion picture as defined in claim 8 in which the parallel lines formed by at least one of the first and second records in each zone are shifted transversely one-half wavelength with respect to the corresponding lines in the preceding zone.

10. A motion picture record as defined in claim 8 having synchronizing indicia associated with said respective zones.

11. A motion picture record as defined in claim 10 in which the synchronizing indica are located between one edge of each zone and an adjacent edge of the record medium.

12. A motion picture record as defined in claim 10 in which the synchronizing indicia are located between adjacent zones of recorded lines and are separably different from the latter.

13. A motion picture record as defined in claim 7, in which the periodicity of the second waveform is a submultiple of the periodicity of the first waveform.

14. A motion picture record as defined in claim 7, further comprising a third record in superimposed relation to the first and second records and varying along each line in accordance with the brightness along a corresponding line of the original picture.

15. In picture reproducing apparatus, the combination of an elongated narrow strip of thin, transparent material having formed thereon (a) a succession of frames containing in superimposed relation a record of suppressed carrier signal modulation representing picture information and a record of a reference carrier signal at a frequency that is related to the frequency of said suppressed carrier by an integer multiple, and (b) a succession of like synchronizing indicia associated with said frames, respectively, means for transporting said strip through a scanning zone, means for scanning said strip at said zone to produce first signals having components representing said suppressed carrier modulation and said reference carrier, and second signals representing said synchronizing indicia, means jointly responsive to said components of the first signals for extracting said carrier modulation, a picture tube having means responsive to said extracted carrier modulation and synchronized with said scanning means for producing a succession of visible fields representing information recorded in said frames, and means responsive to the relative times of occurrence of said second signals and said visible fields for maintaining the two in synchronism.

16. Picture reproducing apparatus as defined in claim 15 in which:

the recorded suppressed carrier is modulated in amplitude and phase in accordance with two components of color picture information, the frequency of the recorded reference carrier is a submultiple of the suppressed carrier frequency, the apparatus further comprises means responsive to said first signals for multiplying the frequency of the component of the first signals which represents the reference carrier, the carrier modulation extracting means is responsive jointly to the component of the first signals representing the suppressed carrier modulation and to said signals of multiplied frequency, and the picture tube is a color picture tube.

17. Picture reproducing apparatus as defined in claim 16 in which:

the frames also contain a record of brightness picture information superimposed on the records of the suppressed carrier modulation and the reference carrier, the recorded suppressed carrier sideband amplitude and phase represent color saturation and hue information, respectively, and the first signals represent brightness information in addition to suppressed carrier modulation and the reference carrier, the apparatus includes means responsive to said first signals for separating out of said first signals the brightness information component, the suppressed carrier modulation component and the reference carrier component, the carrier modulation extracting means is jointly responsive to the suppressed carrier modulation component and to the multiplied reference carrier component and produces outputs representing color saturation and hue information, and the apparatus further comprises means which is responsive to said brightness component and to said last-named outputs for producing a plurality of different color information signals therefrom which are supplied to the color picture tube.

18. A picture information record for the reproduction of color picture information using scanning techniques, comprising:

a strip of thin transparent material, having at least one zone of picture information, the zone comprising a record of a first series of essentially parallel lines extending longitudinally of the zone and having a characteristic varying along any transverse section of the zone in accordance with color in a corresponding section of the original picture, a record of a second series of parallel lines extending longitudinally of each zone, the nominal number of parallel lines in one of the series being related to the nominal number of parallel lines in the other series by an integer multiple, the first and second series being productive of first and second periodic waveforms of which the periodicities are related by such multiple and of which the instantaneous relative phase is determinable when the record is interrogated by a beam scanning transversely of the zone.

19. A picture information record as defined in claim 18, in which:

the varying characteristic of the first series of lines is the optical transmissivity thereof.

20. A picture information record as defined in claim 18, in which:

the varying characteristic of the first series of lines is the transverse location thereof relative to the lines of the second series across any such transverse section.

21. A picture information record as set forth in claim 18, in which:

the varying characteristic of the first series is the optical transmissitvity of each line thereof combined with the transverse location of each line thereof relative to the lines of the second series across any such transverse section.

22. A picture information record as defined in claim 21, in which:

the relative transverse location and optical transmissivity of each line of the first series across such transverse section is related to the color hue and saturation across a corresponding section of the original picture, respectively.

23. In apparatus for reproducing original picture information as a video signal, the combination of:

an elongated record medium containing a succession of closely-spaced, longitudinally displaced strips extending transversely across the record medium, each of the strips containing (a) a record of a suppressed carrier waveform modulated in accordance with a component of picture information contained in a corresponding strips of the original and having an equal number of cyclic variations in each strip when the carrier is modulated at a given frequency, and (b) a superposed record of a pilot carrier waveform having a number of cyclic variations in each strip that is related to the nominal number of cycles in the first record such that an information-yielding characteristic of the strips forms essentially a closely-spaced series of parallel lines extending longitudinally of the record medium;

means for transporting the record medium through a scanning zone, and scanning detector means for scanning in a line-by-line sequence the transverse strips on the record medium to derive simultaneously first and second electrical signals representing, respectively, the pilot and suppressed carrier waveforms at a given phase difference related to the modulating component.

24. Apparatus according to claim 23, further comprising:

means for combining the first and second electrical signals to extract a video signal representative of the modulation of the suppressed carrier signal.

25. Apparatus as defined in claim 23, in which each record medium strip contains, additionally (c) another record in superposed relation which varies transversely along the strips in accordance with another component of picture information contained in a corresponding strip of the original picture, and further in which the scanning means derives a third electrical signal representative of said other picture information component, the apparatus further comprising:

means for separating the third electrical signal from the first and second electrical signals.

26. Apparatus as defined in claim 25, in which:

the periodicity of the cyclic variations of the record of the suppressed carrier on the record medium is such to yield a second electrical signal having substantially all frequency components thereof extraneous to the frequency bandwidth of the third electrical signal when scanned by the scanning means.

27. In picture reproduction apparatus, the combination of:

a record medium having at least one zone of picture information containing a record of a first series of essentially parallel lines extending across the zone and having a characteristic varying along any section of the zone normal to the lines in accordance with a component of picture information contained in a corresponding section of the original, and a superposed record of a second series of essentially parallel lines extending across the zone parallel to the first series, the nominal number of parallel lines in one series being related to the nominal number of parallel lines in the other series in each zone by a constant, means for transporting the record medium through a scanning zone;

scanning detector means for scanning the zones in a line-by-line sequence generally normal to the line series to derive simultaneously first and second electrical signals representing first and second periodic waveforms of which the periodicities are related by such constant;

means responsive to the second signal for generating a control signal representative of the amplitude thereof; and amplifier means jointly responsive to the first signal and to the control signal and having a variable gain characteristic related to and controlled by the control signal for maintaining substantially constant the amplitude of the first signal at the output of the amplifier.

28. Apparatus as defined in claim 27 in which the first signal is a suppressed carrier signal modulated as a function of the picture information component, the apparatus further comprising:

means jointly responsive to the second signal and to the first signal at the output of the amplifying means for recovering the modulation of the suppressed carrier signal from the first electrical signal.

29. A record medium for the reproduction of picture information comprising,
a strip of thin record material having recorded in a frame thereon a representation of picture information in an original,
said representation being in a plurality of parallel elemental zones extending across said frame and comprising,
a first record portion including elements having a first spatial nominal periodicity in the direction of the zone and representing a characteristic of the picture information contained in a corresponding zone of the original, and
a second record portion superimposed upon said first record portion,
said second record portion including elements having a second spatial nominal periodicity in the direction of said zone that is related to said first nominal periodicity by a constant, and
the second record portion elements in successive zones being aligned in a direction substantially normal to said zones.

30. A record medium according to claim 29, in which: the constant relating the spatial periodicities of the record portions is an integer.

31. A record medium according to claim 29, in which: the characteristic of the picture information is represented by the optical transmissivity of the elements in said first record portion.

32. A record medium according to claim 29, in which: the characteristic of the picture information is represented by the spatial location of the elements of the first record portion relative to the elements of the second record portion.

33. A record medium according to claim 29, in which: the characteristic of the picture information is represented by optical transmissivity of the elements of the first record portion combined with the spatial location thereof relative to the elements of the second record portion in such zones.

34. A record medium according to claim 33, in which: the relative spatial location and optical transmissivity of the elements of the first record portion in any such zone is related to the color hue and saturation of the picture, respectively, in a corresponding zone of the original picture.

35. A record medium as defined in claim 29, in which: the elements of the first record portion have a spatial distribution in the direction of the zones to be in substantial alignment in a direction nominal to the direction of the zones.

36. In combination with the record medium of claim 29:
scanning detector means for scanning the zones in a line-by-line sequence generally parallel thereto to simultaneously derive first and second periodic electrical waveforms of which the periodicities are related by such constant.

37. The combination of claim 36, further comprising: means for combining the first and second electrical waveforms for recovering from the first waveform the characteristic of picture information represented by the elements of the first record portion.

38. The combination of claim 36, in which: the first electrical waveform is modulated in amplitude in accordance with the picture information characteristic.

39. The combination of claim 38, in which: the first electrical waveform is modulated in phase in accordance with a different characteristic of such picture information.

40. In apparatus for recording information as a video signal in monochrome on a radiation-sensitive record medium for later reproduction by scanning techniques, the combination of
means for subjecting at least one zone on the record medium to a line scanning operation with a recording beam of radiation at a given line scan rate to record thereon a succession of substantially contiguous record lines,
means for modulating the intensity of the beam as a function of an information carrier signal having a frequency that is a multiple of the line scan rate, and
means for simultaneously modulating the carrier signal as a function of a component of the information to be recorded.

41. Apparatus as defined in claim 40, further comprising:
means for recording in the record lines of the record medium zone a superimposed record of a second carrier signal having a frequency that is related to the frequency of the information carrier signal by an integer multiple.

42. Apparatus as defined in claim 41, in which: the last-named means records the second carrier simultaneously with the recording of the modulated carrier.

43. Apparatus as defined in claim 40, further comprising:
means for simultaneously recording an image representation of a different component of picture information in the zone.

44. Apparatus for recording original color picture information in monochrome on a radiant energy sensitive medium for reproduction by television scanning techniques, comprising:
means for subjecting a series of parallel elemental zones in a frame area of the medium to a radiant energy imgae of a periodic waveform at a given frequency to have record elements representing cyclic variations thereof in alignment normal to the zones in the frame; and
means for subjecting the zones to a radiant energy image of a second periodic waveform at a different frequency related to the given frequency by a constant, the second waveform being modulated in phase according to a component of the color in corresponding elemental zones of the original picture to record phase variations thereof as record elements of which the spacial relation to the elements of the first waveform is representative of the color component.

45. In apparatus for recording information on a radiant energy sensitive record medium:
means for subjecting the record medium in a scanning zone to a line scanning operation with a radiant energy beam at a given line scan rate to record thereon a succession of substantially contiguous parallel lines,
means for modulating the intensity of said beam as a function of a first carrier signal having a frequency that is a multiple of said line scan rate,
means for simultaneously modulating the carrier signal as a function of information to be recorded, and
means for recording in superimposed relation in said contiguous lines a second carrier signal having a different frequency that is related to the frequency of the carrier signal by an integer multiple.

46. Apparatus as defined in claim 45 in which the first carrier signal is modulated in amplitude and phase in accordance with color saturation and hue information in the picture.

47. Apparatus as defined in claim 46 in which the scanning means scans the medium transversely, the apparatus further comprising means for conveying the record medium through the scanning zone to record the original picture information in a succession of longitudinally displaced frames that are anamorphosed in the direction of transport of the record medium.

48. Apparatus according to claim 46, in which the succession of substantially contiguous lines are recorded so as to produce a succession of frames, each containing picture information, the apparatus further comprising means for reversing the phase of at least one of the carriers upon completion of the recording of each frame.

49. In apparatus for reproducing color picture information from a monochrome photographic medium having recorded in elemental parallel zones in an area thereon superimposed records of an information carrier signal modulated in phase according to a component of the information and a reference carrier at a different frequency;

means for scanning the elemental zones recorded on the medium to produce an electrical video signal having components representing the information carrier and reference carrier signals;

means for separately extracting the carrier components from the video signal; and phase detector means jointly responsive to the extracted carrier components for recovering the modulating information from the information carrier component.

50. Apparatus according to claim 49, in which;

the extracting means comprises frequency selective means for separating the carrier components from the video signal; and the detector means includes frequency converting means responsive to the reference carrier component for deriving a reference signal at the frequency of the information carrier component, and synchronous detector means for comparing the phases of the information carrier component and the reference signal.

51. Apparatus as defined in claim 50, in which the scanning means comprises:

means productive of a periodically sweeping light beam tracing out scan lines that are mutually displaced in relation to the information area of the medium; and photodetector means responsive to modulation of the light beam by the information recorded to produce the video signal.

References Cited

UNITED STATES PATENTS

| | | | |
|---|---|---|---|
| 3,137,768 | 6/1964 | Mullin | 178—6.6 |
| 3,234,324 | 2/1966 | Mutschler. | |

OTHER REFERENCES

McIlwain et al., Principles of Color Television, Wiley and Sons, New York, 1956, p. 337.

RICHARD MURRAY, Primary Examiner

U.S. Cl. X.R.

178—5

PO-1050
(5/69)

UNITED STATES PATENT OFFICE
CERTIFICATE OF CORRECTION

Patent No. 3,459,885 Dated August 5, 1969

Inventor(s) Peter C. Goldmark et al.

It is certified that error appears in the above-identified patent and that said Letters Patent are hereby corrected as shown below:

Column 1, line 35, insert --and now abandoned-- after "1964' column 1, line 59, "theefrom" should read --therefrom--. Column 2, line 57, "sucessive fames" should read --successive frames--. Column 3, line 25, "bightness" should read --bright ness--. Column 4, line 17, "on" should read --in--. Column 5 line 54, "horizotal" should read --horizontal--. Column 6, line 32, "57" should read --67--. Column 7, line 65, "synchronus" should read --synchronous--. Column 10, line 38, "horizointal" should read --horizontal--. Column 11, line 44, "record" should read --recorded--; column 11, line 50, "of" should read --on--. Column 13, line 71, "strips" should read --strip--. Column 16, line 33, "imgae" should read --image--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents